US009012755B2

(12) United States Patent
Eom et al.

(10) Patent No.: US 9,012,755 B2
(45) Date of Patent: Apr. 21, 2015

(54) METHOD AND APPARATUS FOR STORING/SEARCHING FOR MUSIC

(75) Inventors: Ki-wan Eom, Suwon-si (KR); Jae-won Lee, Seoul (KR); Jung-eun Kim, Yongin-si (KR); Jing Deng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 906 days.

(21) Appl. No.: 12/081,410

(22) Filed: Apr. 15, 2008

(65) Prior Publication Data

US 2009/0173214 A1 Jul. 9, 2009

(30) Foreign Application Priority Data

Jan. 7, 2008 (KR) .................. 10-2008-0001833

(51) Int. Cl.
  *G10H 1/40* (2006.01)
  *G10H 1/00* (2006.01)
  *G06F 17/30* (2006.01)

(52) U.S. Cl.
  CPC ........ *G10H 1/0008* (2013.01); *G06F 17/30746* (2013.01); *G06F 17/30758* (2013.01); *G10H 2210/061* (2013.01); *G10H 2210/071* (2013.01); *G10H 2220/011* (2013.01); *G10H 2240/141* (2013.01)

(58) Field of Classification Search
  None
  See application file for complete search history.

(56) References Cited

U.S. PATENT DOCUMENTS

| 6,476,306 | B2* | 11/2002 | Huopaniemi et al. .......... 84/609 |
| 6,931,377 | B1 | 8/2005 | Seya |
| 7,171,046 | B2 | 1/2007 | Myers et al. |
| 7,488,886 | B2* | 2/2009 | Kemp ............................. 84/609 |
| 7,605,322 | B2* | 10/2009 | Nakamura ...................... 84/613 |
| 2001/0020412 | A1* | 9/2001 | Aoki et al. ...................... 84/611 |
| 2002/0038597 | A1* | 4/2002 | Huopaniemi et al. .......... 84/609 |
| 2003/0009336 | A1* | 1/2003 | Kenmochi et al. ............ 704/258 |
| 2003/0023421 | A1* | 1/2003 | Finn et al. .......................... 704/1 |
| 2006/0185504 | A1* | 8/2006 | Kobayashi ...................... 84/645 |
| 2006/0230909 | A1* | 10/2006 | Song et al. ...................... 84/609 |
| 2006/0230910 | A1* | 10/2006 | Song et al. ...................... 84/616 |

(Continued)

FOREIGN PATENT DOCUMENTS

| JP | 2007-183921 | 7/2007 |
| JP | 2007-316692 | 12/2007 |
| KR | 10-0468971 | 1/2005 |

(Continued)

OTHER PUBLICATIONS

Motoyuki Suzuki et al., "Music Information Retrieval from a Singing Voice Using Lyrics and Melody Information" Graduate School of Engineering, Tohoku University, Hindawi Publishing Corporation EURASIP Journal on Advances in Signal Processing, vol. 2007, Article ID 38727, 8 pages.

(Continued)

*Primary Examiner* — Marlon Fletcher
(74) *Attorney, Agent, or Firm* — Staas & Halsey LLP

(57) ABSTRACT

Provided are a method and apparatus for generating and storing a database that may be searched for music upon a user's request, and a method and apparatus for searching for music corresponding to the user's request. According to an embodiment of the present invention, a plurality of melodies are divided based on phrase breaks and are stored, and a number of melodies which are similar to the user's request are detected from the stored melodies.

23 Claims, 12 Drawing Sheets

(56) References Cited

U.S. PATENT DOCUMENTS

2007/0131094 A1* 6/2007 Kemp .......................... 84/609
2009/0314155 A1* 12/2009 Qian et al. ..................... 84/622

FOREIGN PATENT DOCUMENTS

| KR | 10-2005-0053903 A | 6/2005 |
| KR | 10-2005-0102696 A | 10/2005 |
| KR | 10-0542854 | 1/2006 |
| KR | 10-2006-0020114 A | 3/2006 |
| KR | 100678923 | 1/2007 |
| KR | 10-0705176 B1 | 4/2007 |
| KR | 10-200-0078029 A | 7/2007 |
| KR | 10-2007-0080481 A | 8/2007 |

OTHER PUBLICATIONS

Korean Notice of Non-Final Rejection issued Feb. 24, 2014 in corresponding Korean Patent Application 10-2008-0001833.

Korean Notice of Final Rejection issued Aug. 22, 2014 in corresponding Korean Patent Application 10-2008-0001833.

Korean Notice of Allowance issued Dec. 15, 2014 in corresponding Korean Patent Application 10-2008-001833.

* cited by examiner

FIG. 11 o a reum da un eum ak gat eun u ri ui sa rang ui i ya gi deul eun o a reum da B un eum ak B gat eun u ri ui B sa rang ui i ya B gi deul eun o IP a reum da un AP eum ak NP gat eun IP u ri ui AP sa rang ui AP i ya gi deul eun o IP a reum da un AP eum ak NP gat eun IP u ri ui AP sa rang ui AP i ya gi deul eun o MS a reum da un MS eum ak gat eun MS u ri ui MS sa rang ui i ya gi deul eun

METHOD AND APPARATUS FOR STORING/SEARCHING FOR MUSIC

CROSS-REFERENCE TO RELATED PATENT APPLICATION

This application claims the benefit of Korean Patent Application No. 10-2008-0001833, filed on Jan. 7, 2008, in the Korean Intellectual Property Office, the disclosure of which is incorporated herein in its entirety by reference.

BACKGROUND OF THE INVENTION

1. Field of the Invention

The present invention relates to a method and apparatus for searching for music, and more particularly, to a method and apparatus for generating a database that may be searched for music when humming or singing is input as a user's request, and a method and apparatus for searching for music upon the user's request.

2. Description of the Related Art

When a user has heard or listened to certain music somewhere and does not know the title or lyrics of the music, the user may search for the music by using only humming or singing. For example, if the user inputs humming or singing as a request through an input device such as a microphone, the request is input to a mobile phone or a personal computer (PC). Here, input sound is transmitted to a server through Internet or wireless communication. A database stored in the server is searched for music similar to the transmitted sound and information on the music is provided to the user as a search result.

SUMMARY OF THE INVENTION

The present invention provides a method and apparatus for generating and storing a database that may be searched for music upon a user's request, and a method and apparatus for searching for music corresponding to the user's request.

According to an aspect of the present invention, there is provided an apparatus for searching music, the apparatus comprising: a melody storage unit to divide melodies based on phrase breaks and storing the melodies; and a melody detection unit to detect which are similar to a user's request, from the stored melodies.

According to another aspect of the present invention, there is provided an apparatus for storing music, the apparatus comprising: a division unit for dividing melodies based on phrase breaks; and a melody storage unit for storing the melodies.

According to another aspect of the present invention, there is provided a method of searching music, the method comprising: receiving a user's request; and detecting a number of melodies which are similar to the user's request, from a plurality of melodies which are divided based on phrase breaks and are stored.

According to another aspect of the present invention, there is provided a method of storing music, the method comprising: dividing melodies based on phrase breaks; and storing the melodies.

BRIEF DESCRIPTION OF THE DRAWINGS

The above and other features and advantages of the present invention will become more apparent by describing in detail exemplary embodiments thereof with reference to the attached drawings in which:

FIGS. 11, 13, and 14 are conceptual views each illustrating bars of a song and new bars divided by a method and apparatus for storing music, according to an embodiment of the present invention;

DETAILED DESCRIPTION OF THE INVENTION

Hereinafter, the present invention will be described in detail by explaining embodiments of the invention with reference to the attached drawings.

Figure 1:
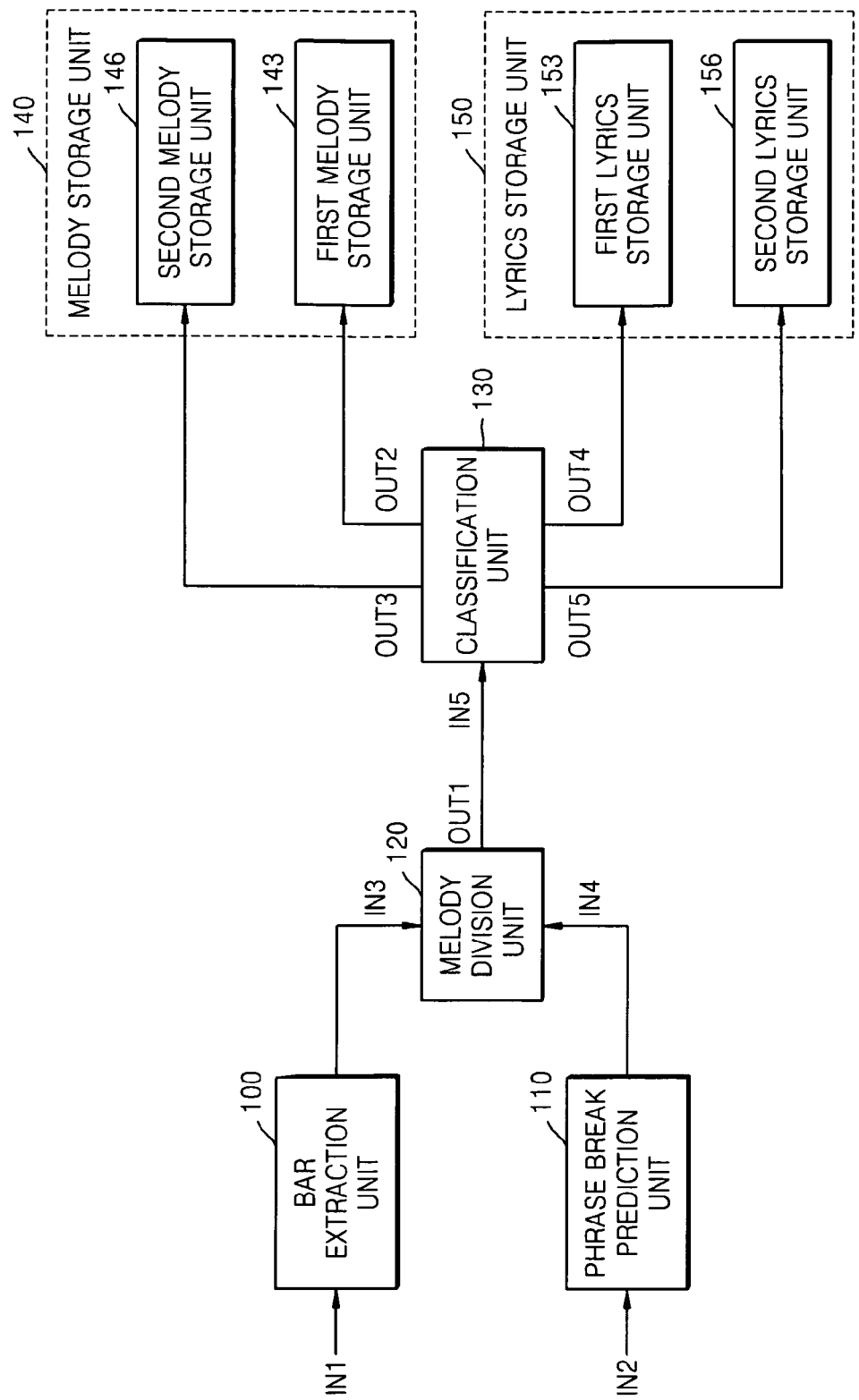
FIG. 1 is a block diagram of an apparatus for storing music, according to an embodiment of the present invention.
Figure 11:
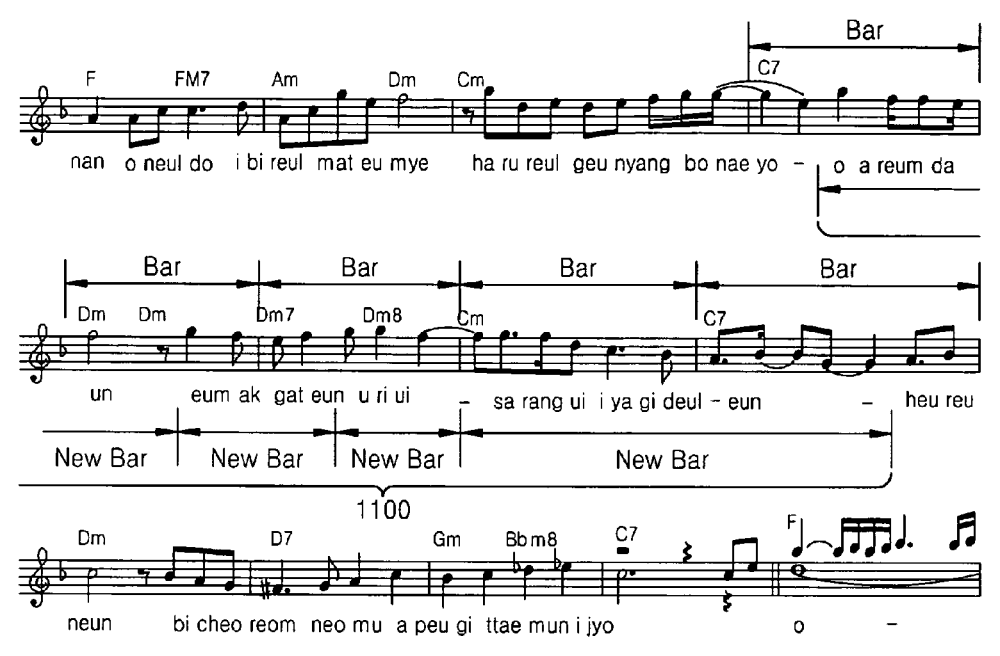
Figures 12A, 12B, 12C, 12D, 12E:
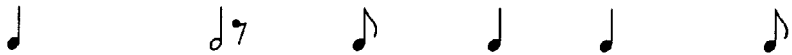
FIG. 12A shows lyrics corresponding to a part 1100 illustrated in FIG. 11, according to an embodiment of the present invention.
FIG. 12B shows lyrics corresponding to the part 1100 illustrated in FIG. 11 which are divided in accordance with bars, according to an embodiment of the present invention.
FIG. 12C shows lyrics corresponding to the part 1100 illustrated in FIG. 11 which are divided into phrases, and characteristics of the phrases, according to an embodiment of the present invention.
FIG. 12D shows lyrics corresponding to the part 1100 illustrated in FIG. 11 which are divided into phrases, and the lengths of last notes of the phrases, according to an embodiment of the present invention.
FIG. 12E shows lyrics corresponding to the part 1100 illustrated in FIG. 11 which are divided by a method and apparatus for storing music, according to an embodiment of the present invention.
Figures 13, 14:
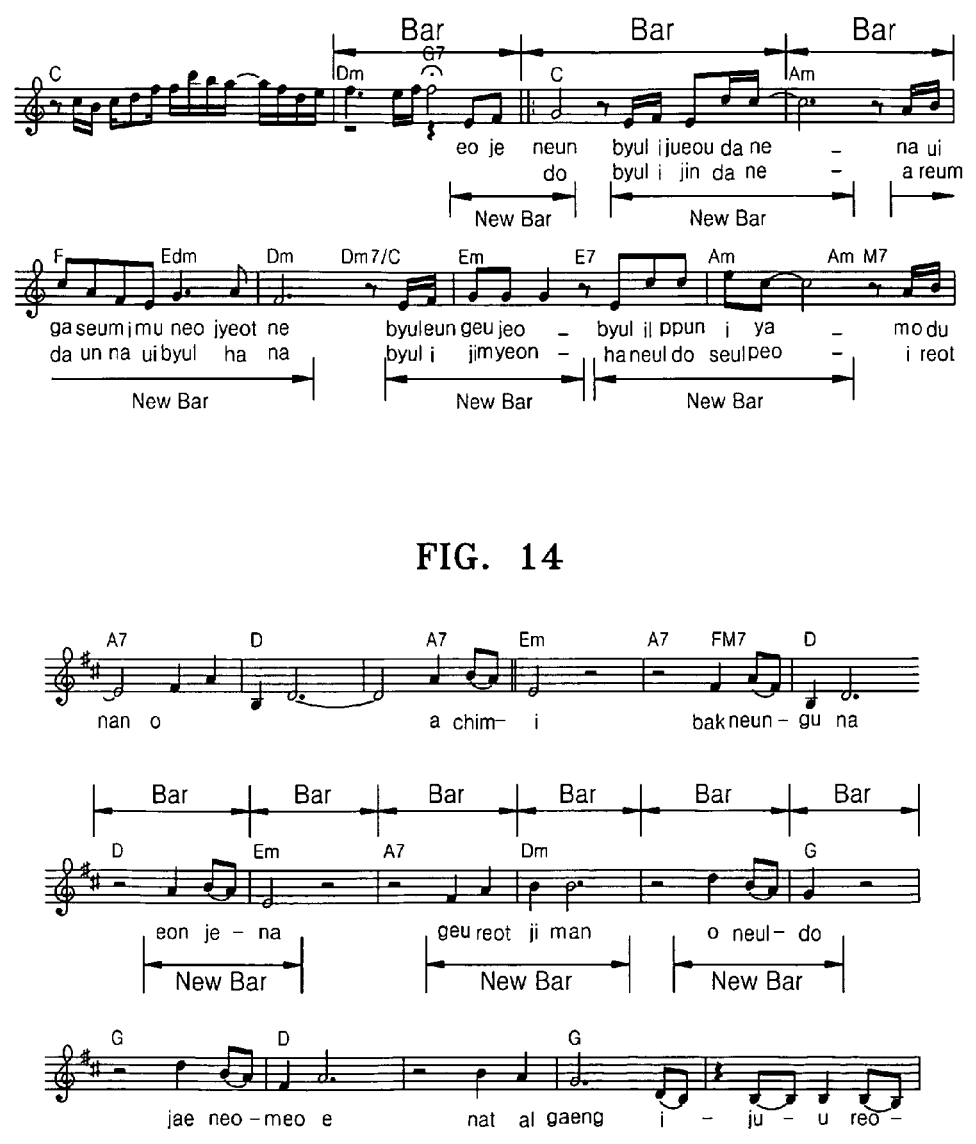

FIG. 1 is a block diagram of an apparatus for storing music, according to an embodiment of the present invention. FIGS. 11, 13, and 14 are conceptual views each illustrating bars of a song and new bars divided by a method and apparatus for storing music, according to an embodiment of the present invention. FIG. 12A shows lyrics corresponding to a part 1100 illustrated in FIG. 11, according to an embodiment of the present invention. FIG. 12B shows lyrics corresponding to the part 1100 illustrated in FIG. 11 which are divided in accordance with bars, according to an embodiment of the present invention. FIG. 12C shows lyrics corresponding to the part 1100 illustrated in FIG. 11 which are divided into phrases, and characteristics of the phrases, according to an embodiment of the present invention. FIG. 12D shows lyrics corresponding to the part 1100 illustrated in FIG. 11 which are divided into phrases, and the lengths of last notes of the phrases, according to an embodiment of the present invention. FIG. 12E shows lyrics corresponding to the part 1100 illustrated in FIG. 11 which are divided by a method and apparatus for storing music, according to an embodiment of the present invention.

Referring to FIG. 1, the apparatus according to the current embodiment of the present invention includes a bar extraction unit 100, a phrase break prediction unit 110, a melody division unit 120, a classification unit 130, a melody storage unit 140, and a lyrics storage unit 150.

The bar extraction unit 100 receives a midi file through an input terminal IN 1 and extracts bars of melodies. According to an embodiment of the present invention, the bar extraction unit 100 may extract the bars from the melodies by using information on beats per measure such as three-quarter time and four-quarter time. For example, the bar extraction unit 100 may extract the bars by using the information on beats per measure as indicated by Bar illustrated in FIGS. 11, 13, and 14. In the lyrics illustrated in FIG. 12A, the bars may be predicted in the melodies as indicated by B illustrated in FIG. 12B.

The phrase break prediction unit 110 receives lyrics through an input terminal IN 2 predicts phrase breaks of the lyrics. For example, the phrase break prediction unit 110 may predict the phrase breaks of the lyrics by using a syntactic structure of a sentence, information on parts of speech, phrase location information, and the like.

According to an embodiment of the present invention, the phrase break prediction unit 110 may predict the phrase breaks by using a prosodic break index (PBI) method. The PBI method is used in order to create natural synthesized sounds in text-to-speech (TTS) system and includes a hidden Markov model (HMM) method, a neural network (NN) method, and a classification and regression tree (CART) method. In accordance with phrase breaks, the PBI method divides phrases by using a non-phrase (NP) that is directly connected to a next phrase without a break, an accentual phrase (AP) that has an accent, and an intonational phrase (IP) and predicts a break after each phrase. For example, in the lyrics illustrated in FIG. 12A, the phrase breaks may be predicted as illustrated in FIG. 12C.

The melody division unit 120 divides the melodies by using the bars extracted by the bar extraction unit 100 and the phrase breaks predicted by the phrase break prediction unit 110. Also, when the melody division unit 120 divides the melodies, the lengths of notes may be further used. For example, the melody division unit 120 may divide the melodies by using the lengths of last notes of the phrases.

As described above, if the melodies are divided by using only the bars extracted by the bar extraction unit 100, a bar may begin in the middle of a phrase of the lyrics and thus a divided melody corresponding to an extracted bar may be different from a melody requested by a user. Accordingly, the performance of 10 searching may be reduced. However, if the melodies are divided in consideration of the phrase breaks predicted by the phrase break prediction unit 110, a start point of a divided melody is the same as the start point of the melody requested by the user and thus music information may be searched more efficiently and promptly.

Figure 2:
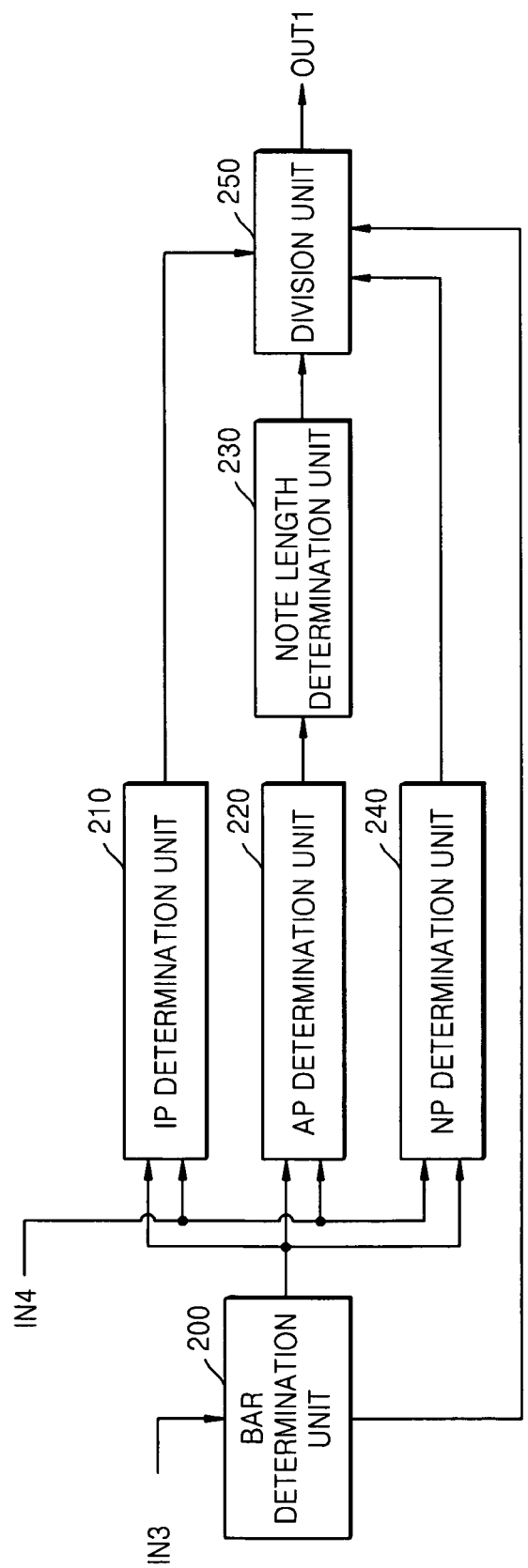
FIG. 2 is a detailed block diagram of a melody division unit illustrated in FIG. 1, according to an embodiment of the present invention.

FIG. 2 is a detailed block diagram of the melody division unit 120 illustrated in FIG. 1, according to an embodiment of the present invention. FIG. 2 will be described in conjunction with FIG. 1.

Referring to FIG. 2, the melody division unit 120 includes a bar determination unit 200, an IP determination unit 210, an AP determination unit 220, a note length determination unit 230, an NP determination unit 240, and a division unit 250.

The bar determination unit 200 determines not to divide melodies at a bar included in a phrase. For example, at points indicated by B which are included in phrases as in "a reum da B un" and "i ya B gi deul eun" illustrated in FIG. 12B, the bar determination unit 200 determines not to divide the melodies and does not mark MSs indicating separation points of the melodies, as illustrated in FIG. 12E.

If the phrase break prediction unit 110 predicts that a phrase of lyrics is an IP, the melodies probably have a break after the phrase and thus the IP determination unit 210 determines to divide the melodies at the end of the phrase. For example, at points indicated by IP which are included between phrases as in "o IP a reum da un" and "gat eun IP u ri ui" illustrated in FIG. 12C, the phrase break prediction unit 110 determines to divide the melodies and marks MSs indicating separation points of the melodies, as illustrated in FIG. 12E.

If the phrase break prediction unit 110 predicts that a phrase of the lyrics is an AP, the melodies possibly have a break after the phrase and thus the AP determination unit 220 determines whether to divide the melodies at the end of the phrase in accordance with the length of a last note of the phrase.

If the note length determination unit 230 determines that the length of a last note of a phrase predicted to be an AP is longer than a preset length, the AP determination unit 220 determines to divide the melodies at the end of the phrase. On the other hand, if the note length determination unit 230 determines that the length of a last note of a phrase predicted to be an AP is equal to or shorter than the preset length, the AP determination unit 220 determines not to divide the melodies at the end of the phrase.

For example, at points indicated by AP which are included between phrases as in "a reum da un AP eum ak", "u ri ui AP sa rang ui", and "sa rang ui AP i ya gi deul eun" illustrated in FIG. 12C, the AP determination unit 220 determines whether to divide the melodies at the ends of phrases in accordance with the lengths of last notes of the phrases. The note length determination unit 230 determines whether each of the lengths of the last notes of the phrases is longer than a half note that is the preset length, and the AP determination unit 220 determines to divide the melodies at "a reum da un AP eum ak" and "u ri ui AP sa rang ui" in which the lengths of last notes of phrases are longer than the half note, and marks MSs indicating separation points of the melodies, as illustrated in FIG. 12E.

If the phrase break prediction unit 110 predicts that a phrase of the lyrics is an NP, the melodies rarely have a break after the phrase and thus the NP determination unit 240 determines not to divide the melodies at the end of the phrase.

The division unit 250 divides the melodies of a midi file input through the input terminal IN 1 in accordance with determination results output from the bar determination unit 200, the IP determination unit 210, the AP determination unit 220, the note length determination unit 230, and the NP determination unit 240, and then outputs divided melodies through an output terminal OUT 1. For example, lyrics illustrated in FIG. 12A are divided by bars as illustrated in FIG. 12B, are divided into phrases as illustrated in FIG. 12C so as to predict characteristics of the phrases, and then are ultimately divided as illustrated in FIG. 12E by using the lengths of last notes of the phrases which are illustrated in FIG. 12D. For example, the division unit 250 may divide the melodies as indicated by New Bar illustrated in FIGS. 11, 13, and 14.

Referring back to FIG. 1, the classification unit 130 classifies melodies divided by the melody division unit 120 into melodies considered to be frequently requested by users and melodies considered to be rarely requested by users. Examples of the melodies considered to be frequently requested by users include first phrase melodies, repeated melodies, and chorus melodies of songs.

The classification unit 130 stores the melodies considered to be frequently requested by users in a first melody storage unit 143 and stores lyrics corresponding to the melodies considered to be frequently requested by users in a first lyrics storage unit 153. However, the classification unit 130 stores the melodies considered to be rarely requested by users in a second melody storage unit 146 and stores lyrics corresponding to the melodies considered to be rarely requested by users in a second lyrics storage unit 156.

Figure 3:
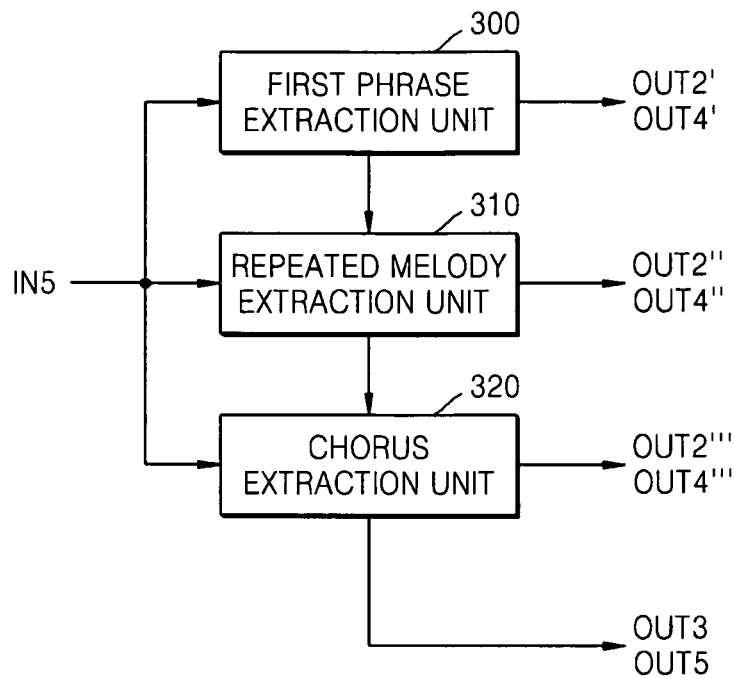
FIG. 3 is a detailed block diagram of a classification unit illustrated in FIG. 1, according to an embodiment of the present invention.

FIG. 3 is a detailed block diagram of the classification unit 130 illustrated in FIG. 1, according to an embodiment of the present invention. FIG. 3 will be described in conjunction with FIG. 1.

Referring to FIG. 3, the classification unit 130 includes a first phrase extraction unit 300, a repeated melody extraction unit 310, and a chorus extraction unit 320.

The first phrase extraction unit 300 extracts first phrase melodies of songs from melodies divided by the melody division unit 120, in accordance with a preset phrase length so as to output through an output terminal OUT 2', and extracts lyrics corresponding to the first phrase melodies so as to output through an output terminal OUT 4'.

The repeated melody extraction unit 310 extracts repeated melodies of the songs which are repeated more than a preset number of times, from the melodies divided by the melody division unit 120 so as to output through an output terminal OUT 2", and extracts lyrics corresponding to the repeated melodies so as to output through an output terminal OUT 4".

The chorus extraction unit 320 extracts chorus melodies of the songs from the melodies divided by the melody division unit 120 so as to output through an output terminal OUT 2''', and extracts lyrics corresponding to the chorus melodies so as to output through an output terminal OUT 4'''.

Melodies which are extracted by the first phrase extraction unit 300, the repeated melody extraction unit 310, and the chorus extraction unit 320 are stored in the first melody storage unit 143 and lyrics corresponding to the melodies are stored in the first lyrics storage unit 153. However, melodies which are not extracted by the first phrase extraction unit 300, the repeated melody extraction unit 310, and the chorus extraction unit 320 are stored in the second melody storage unit 146 and lyrics corresponding to the melodies are stored in the second lyrics storage unit 156.

Referring back to FIG. 1, the melody storage unit 140 stores the melodies divided by the melody division unit 120.

Here, the melody storage unit 140 may include the first melody storage unit 143 and the second melody storage unit 146.

Figure 4:
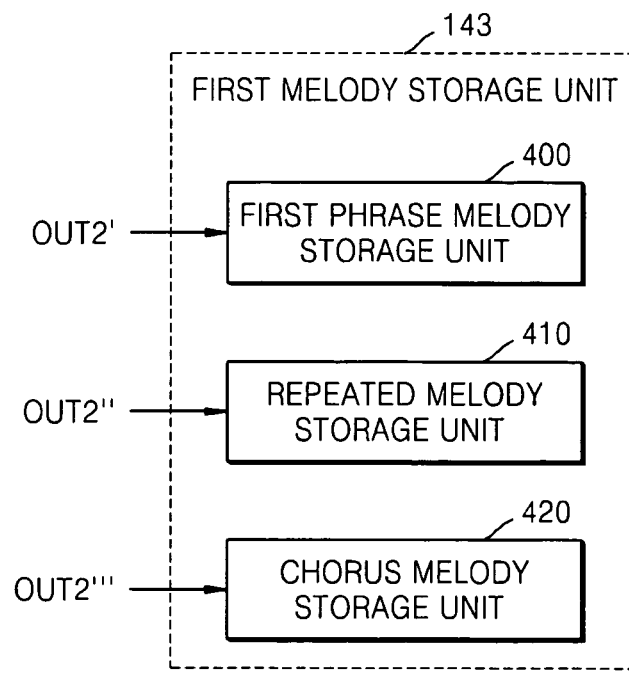
FIG. 4 is a detailed block diagram of a first melody storage unit illustrated in FIG. 1, according to an embodiment of the present invention.

The first melody storage unit 143 stores the melodies considered to be frequently requested by users. The first melody storage unit 143 may include a first phrase melody storage unit 400, a repeated melody storage unit 410, and a chorus melody storage unit 420 as illustrated in FIG. 4. The first phrase melody storage unit 400 stores the first phrase melodies of the songs which are extracted by the first phrase extraction unit 300 illustrated in FIG. 3. The repeated melody storage unit 410 stores the repeated melodies of the songs which are extracted by the repeated melody extraction unit 310 illustrated in FIG. 3. The chorus melody storage unit 420 stores the chorus melodies of the songs which are extracted by the chorus extraction unit 320 illustrated in FIG. 3.

The second melody storage unit 146 stores the melodies considered to be rarely requested by users.

The lyrics storage unit 150 stores divided lyrics corresponding to the melodies divided by the melody division unit 120 such that the divided lyrics are mapped to the divided melodies. Here, the lyrics storage unit 150 may include the first lyrics storage unit 153 and the second lyrics storage unit 156.

Figure 5:
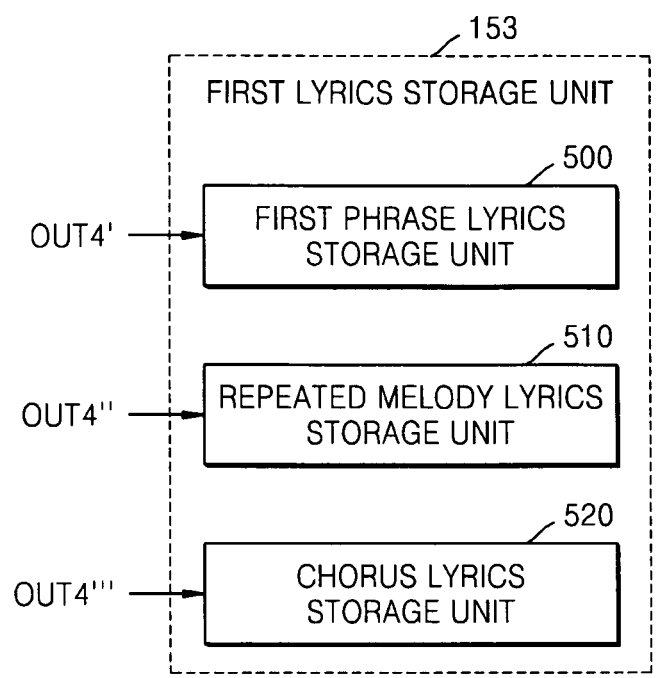
FIG. 5 is a detailed block diagram of a first lyrics storage unit illustrated in FIG. 1, according to an embodiment of the present invention.

The first lyrics storage unit 153 stores lyrics corresponding to the melodies considered to be frequently requested by users. The first lyrics storage unit 153 may include a first phrase lyrics storage unit 500, a repeated melody lyrics storage unit 510, and a chorus lyrics storage unit 520 as illustrated in FIG. 5. The first phrase lyrics storage unit 500 stores lyrics corresponding to the first phrase melodies of the songs which are extracted by the first phrase extraction unit 300 illustrated in FIG. 3. The repeated melody lyrics storage unit 510 stores lyrics corresponding to the repeated melodies of the songs which are extracted by the repeated melody lyrics extraction unit 310 illustrated in FIG. 3. The chorus lyrics storage unit 520 stores lyrics corresponding to the chorus melodies of the songs which are extracted by the chorus extraction unit 320 illustrated in FIG. 3.

The second lyrics storage unit 156 stores lyrics corresponding to the melodies considered to be rarely requested by users.

Figure 6:
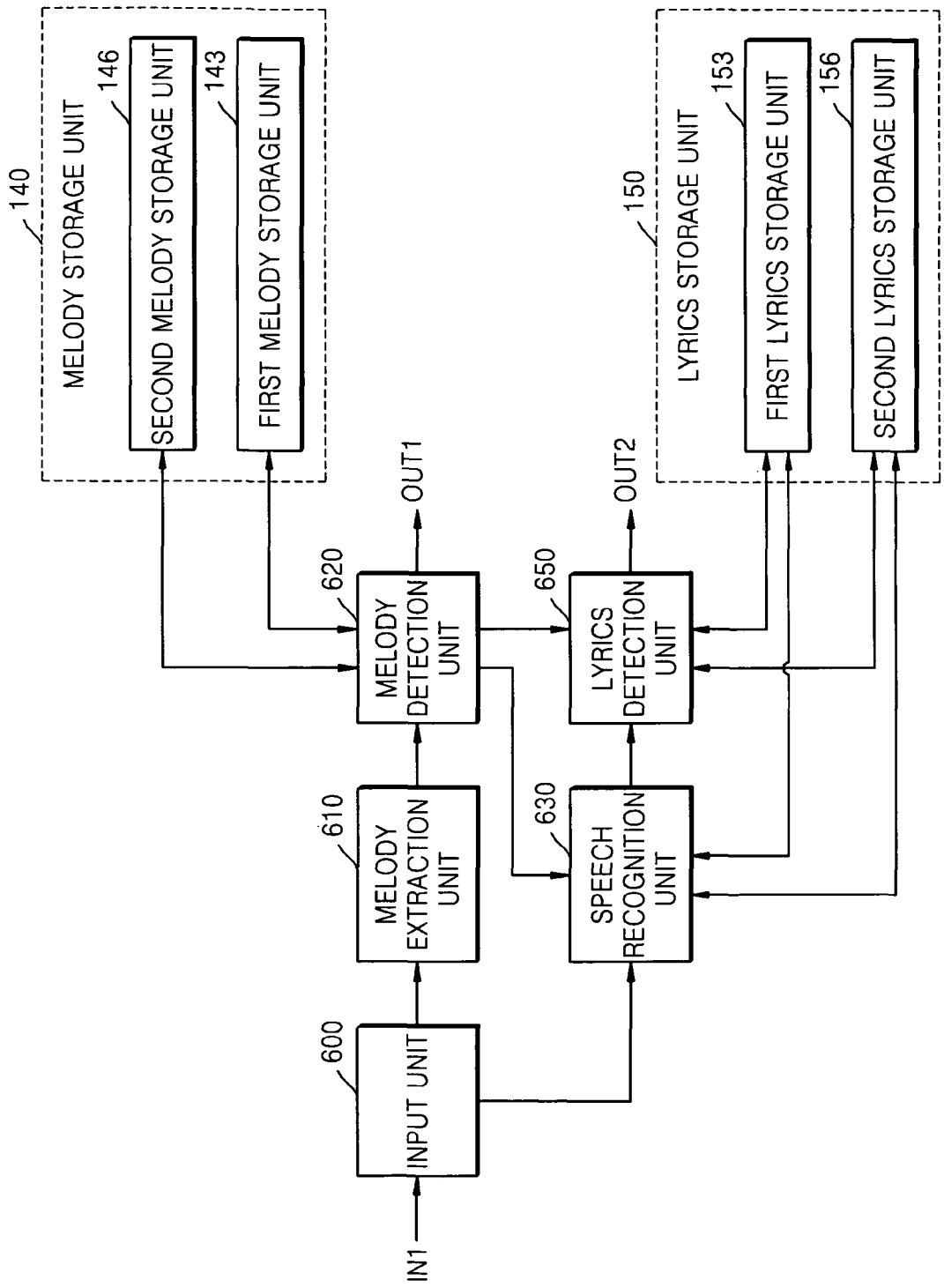
FIG. 6 is a block diagram of an apparatus for searching for music, according to an embodiment of the present invention.

FIG. 6 is a block diagram of an apparatus for searching for music, according to an embodiment of the present invention.

Referring to FIG. 6, the apparatus according to the current embodiment of the present invention includes an input unit 600, a melody extraction unit 610, a melody storage unit 140, a melody detection unit 620, a speech recognition unit 630, a lyrics storage unit 150, and a lyrics detection unit 650. The apparatus according to the current embodiment of FIG. 6 searches for music by comparing a request input by a user to melodies and lyrics which are divided and stored in accordance with a predetermined standard by the apparatus according to the previous embodiment of FIG. 1.

The input unit 600 receives singing or humming as a user's request through an input terminal IN. Here, examples of the user's request include sound vocalized by a user and sound reproduced by a device such as a mobile phone.

The melody extraction unit 610 extracts only a melody from the user's request received by the input unit 600.

The melody storage unit 140 is identical to the melody storage unit 140 of FIG. 1. The melody storage unit 140 stores melodies which are divided in accordance with at least one of bars extracted from the melodies, phrase characteristics predicted from lyrics, and note lengths of phrases. If the melody storage unit 140 stores melodies divided in accordance with the note lengths, the melodies may be divided and stored in accordance with the lengths of last notes of the phrases. Technical explanation regarding the dividing of the melodies is described in detail above with reference to FIG. 1.

Also, the melody storage unit 140 may include a first melody storage unit 143 and a second melody storage unit 146 as described above with reference to FIG. 1.

The first melody storage unit 143 stores melodies considered to be frequently requested by users. The first melody storage unit 143 may include the first phrase melody storage unit 400, the repeated melody storage unit 410, and the chorus melody storage unit 420 as illustrated in FIG. 4. The first phrase melody storage unit 400 stores first phrase melodies of songs. The repeated melody storage unit 410 stores repeated melodies of the songs which are repeated more than a preset number of times. The chorus melody storage unit 420 stores chorus melodies of the songs.

The second melody storage unit 146 stores melodies considered to be rarely requested by users.

The melody detection unit 620 detects a preset number of melodies which are similar to the melody extracted by the melody extraction unit 610, from the melodies which are divided in accordance with at least one of the bars extracted from the melodies, the phrase characteristics predicted from the lyrics, and the note lengths of the phrases, and are stored in the melody storage unit 140. Firstly, the melody detection unit 620 detects the preset number of melodies by searching the first melody storage unit 143. Then, if the preset number of melodies are not detected by searching the first melody storage unit 143, the melody detection unit 620 detects the preset number of melodies by searching the second melody storage unit 146. In more detail, the first melody storage unit 143 in which the melodies considered to be frequently requested by users, such as the first phrase melodies, the repeated melodies, and the chorus melodies, are stored is firstly searched, and then the second melody storage unit 146 in which the melodies considered to be rarely requested by users are stored is searched.

If the melody extracted by the melody extraction unit 610 and the preset number of melodies detected by the melody detection unit 620 have a similarity value greater than a preset threshold value, the searching of the music is terminated. For example, the similarity value may represent how similar certain melodies are. In this case, the preset threshold value may be 0.7. However, the present invention is not limited thereto and the preset threshold value is variable. Also, in this case, the melody extraction unit 610 outputs information on pieces of music corresponding to the detected melodies through an output terminal OUT 1.

The speech recognition unit 630 recognizes only speech from the user's request received by the input unit 600 in order to compare the speech to words included in lyrics which are stored in the lyrics detection unit 650 and correspond to the melodies detected by the melody detection unit 620.

The lyrics storage unit 150 is identical to the lyrics storage unit 150 of FIG. 1. The lyrics storage unit 150 stores divided lyrics corresponding to melodies which are divided in accordance with at least one of the bars extracted from the melodies, the phrase characteristics predicted from the lyrics, and the note lengths of the phrases. If the lyrics storage unit 150 stores divided lyrics corresponding to melodies divided in accordance with the note lengths, the divided lyrics corresponding to the melodies divided in accordance with the lengths of the last notes of the phrases may be stored. Technical explanation regarding the storing of the divided lyrics is described in detail above with reference to FIG. 1.

Also, the lyrics storage unit 150 may include a first lyrics storage unit 153 and a second lyrics storage unit 156 as described above with reference to FIG. 1.

The first lyrics storage unit 153 stores lyrics considered to be frequently requested by users or lyrics corresponding to the melodies considered to be frequently requested by users. The first lyrics storage unit 153 may include the first phrase lyrics storage unit 500, the repeated melody lyrics storage unit 510, and the chorus lyrics storage unit 520 as illustrated in FIG. 5. The first phrase lyrics storage unit 500 stores lyrics corresponding to the first phrase melodies of the songs. The repeated melody lyrics storage unit 510 stores lyrics corresponding to the repeated melodies of the songs which are repeated more than the preset number of times. The chorus lyrics storage unit 520 stores lyrics corresponding to the chorus melodies of the songs.

The second lyrics storage unit 156 stores lyrics considered to be rarely requested by users or lyrics corresponding to the melodies considered to be rarely requested by users.

The lyrics detection unit 650 detects a preset number of lyrics which are similar to the speech extracted by the speech recognition unit 630, from the lyrics stored in the lyrics storage unit 150 which correspond to the melodies detected by the melody detection unit 620. The preset number of lyrics may be set to be greatly smaller than the preset number of melodies.

Firstly, the lyrics detection unit 650 detects the preset number of lyrics by searching the first lyrics storage unit 153. Then, if the preset number of lyrics are not detected by searching the first lyrics storage unit 153, the lyrics detection unit 650 detects the preset number of lyrics by searching the second lyrics storage unit 156. In more detail, the first lyrics storage unit 153 in which the lyrics considered to be frequently requested by users or the lyrics corresponding to the melodies considered to be frequently requested by users, such as the first phrase melodies, the repeated melodies, and the chorus melodies, are stored is firstly searched, and then the second lyrics storage unit 156 in which the lyrics considered to be rarely requested by users or the lyrics corresponding to the melodies considered to be rarely requested by users are stored is searched. The lyrics detection unit 650 outputs information on pieces of music corresponding to the detected lyrics through an output terminal OUT 2.

Figure 7:
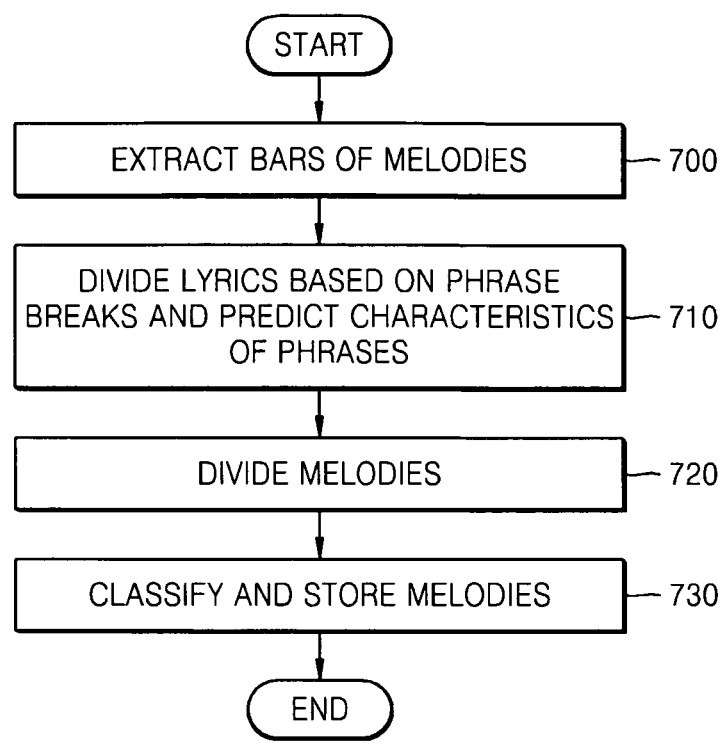
FIG. 7 is a flowchart of a method of storing music, according to an embodiment of the present invention.

FIG. 7 is a flowchart of a method of storing music, according to an embodiment of the present invention.

Referring to FIG. 7, a midi file is received and bars of melodies are extracted in operation 700. In the present invention, a phrase is a unit of a break in a sentence. According to an embodiment of the present invention, the bars may be extracted from the melodies by using information on beats per measure such as three-quarter time and four-quarter time. For example, in operation 700, the bars may be extracted by using the information on beats per measure as indicated by Bar illustrated in FIGS. 11, 13, and 14. In the lyrics illustrated in FIG. 12A, the bars may be predicted in the melodies as indicated by B illustrated in FIG. 12B.

After operation 700 is performed, lyrics are received and phrase breaks of the lyrics are predicted in operation 710. For example, in operation 710, the phrase breaks of the lyrics may be predicted by using a syntactic structure of a sentence, information on parts of speech, phrase location information, and the like.

According to an embodiment of the present invention, in operation 710, the phrase breaks may be predicted by using a PBI method. The PBI method is used in order to create natural synthesized sounds in TTS system and includes an HMM method, an NN method, and a CART method. In accordance with phrase breaks, the PBI method divides phrases by using an NP that is directly connected to a next phrase without a break, an AP that has an accent, and an IP and predicts a break after each phrase. For example, in the lyrics illustrated in FIG. 12A, the phrase breaks may be predicted as illustrated in FIG. 12C.

The melodies are divided by using the bars extracted in operation 700 and the phrase breaks predicted in operation 710, in operation 720. Also, in operation 720, the melodies may be divided by further using the lengths of notes. For example, in operation 720, the melodies may be divided by using the lengths of last notes of the phrases.

Figure 8:
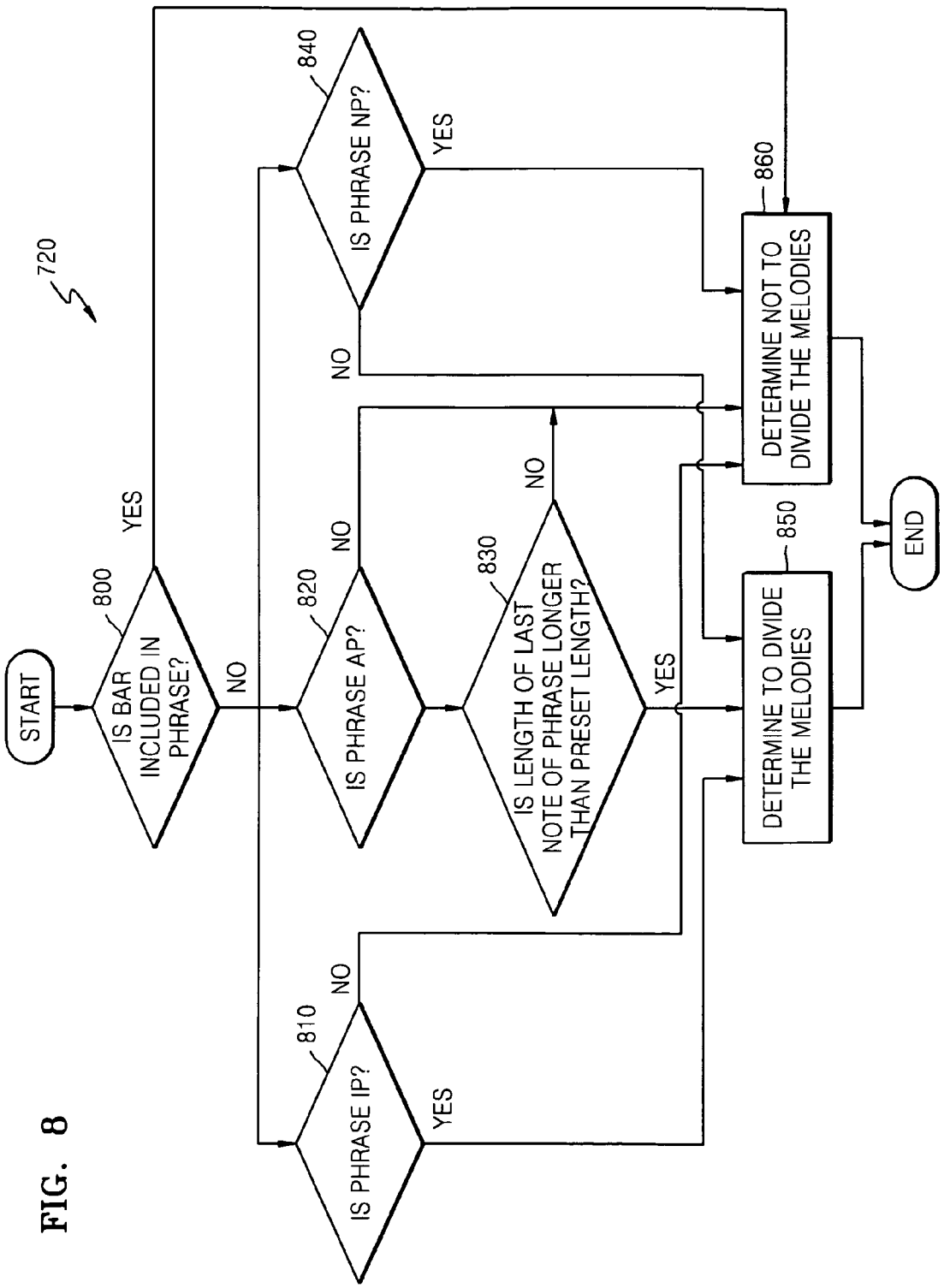
FIG. 8 is a detailed flowchart of operation 720 illustrated in FIG. 7, according to an embodiment of the present invention.

FIG. 8 is a detailed flowchart of operation 720 illustrated in FIG. 7, according to an embodiment of the present invention.

Referring to FIG. 8, it is determined whether each of bars extracted in operation 700 illustrated in FIG. 7 is included in a phrase in operation 800. If it is determined that a bar is included in a phrase in operation 800, melodies are determined not to be divided at the bar in operation 860. For example, at points indicated by B which are included in phrases as in "a reum da B un" and "i ya B gi deul eun" illustrated in FIG. 12B, the melodies are determined not to be divided and MSs indicating separation points of the melodies are not marked, as illustrated in FIG. 12E.

It is determined whether each of phrases divided by phrase breaks predicted in operation 710 illustrated in FIG. 7 is an IP in operation 810. If it is determined that a phrase is an IP in operation 810, the melodies probably have a break after the phrase and thus the melodies are determined to be divided at the end of the phrase in operation 850. For example, at points indicated by IP which are included between phrases as in "o IP a reum da un" and "gat eun IP u ri ui" illustrated in FIG. 12C, the melodies are determined to be divided and MSs indicating separation points of the melodies are marked, as illustrated in FIG. 12E.

It is determined whether each of the phrases divided by the phrase breaks predicted in operation 710 is an AP in operation 820.

If it is determined that a phrase is an AP in operation 820, it is determined whether the length of a last note of the phrase is longer than a preset length in operation 830. If the length of the last note of the phrase is longer than the preset length, the melodies are determined to be divided at the end of the phrase in operation 850. However, if the length of the last note of the phrase is equal to or shorter than the preset length, the melodies are determined not to be divided at the end of the phrase in operation 860.

For example, in order to determine whether to divide the memory at points indicated by AP which are included between phrases as in "a reum da un AP eum ak", "u ri ui AP sa rang ui", and "sa rang ui AP i ya gi deul eun" illustrated in FIG. 12C, it is determined whether the length of the last note of the phrase is longer than a half note that is the preset length. At "a reum da un AP eum ak" and "u ri ui AP sa rang ui" in which the length of the last note of the phrase is longer than the half note, the melodies are determined to be divided and MSs indicating separation points of the melodies are marked, as illustrated in FIG. 12E.

It is determined whether each of the phrases divided by the phrase breaks predicted in operation 710 illustrated in FIG. 7 is an NP in operation 840. If it is determined that a phrase is an NP, the melodies rarely have a break after the phrase and thus the melodies are determined not to be divided at the end of the phrase in operation 860.

Referring back to FIG. 7, the melodies of the received midi file are divided in accordance with determination results of operations 850 and 860 illustrated in FIG. 8, in operation 720. For example, lyrics illustrated in FIG. 12A are divided by bars as illustrated in FIG. 12B, are divided into phrases as illustrated in FIG. 12C so as to predict characteristics of the phrases, and then are ultimately divided as illustrated in FIG. 12E by using the lengths of last notes of the phrases which are illustrated in FIG. 12D. For example, the division unit 250 may divide the melodies as indicated by New Bar illustrated in FIGS. 11, 13, and 14.

Melodies divided in operation 720 are classified into melodies considered to be frequently requested by users and melodies considered to be rarely requested by users in operation 730. Examples of the melodies considered to be frequently requested by users include first phrase melodies, repeated melodies, and chorus melodies of songs.

In operation 730, the melodies considered to be frequently requested by users are stored in a first melody storage region and lyrics corresponding to the melodies considered to be frequently requested by users are stored in a first lyrics storage region. However, in operation 730, the melodies considered to be rarely requested by users are stored in a second melody storage region and lyrics corresponding to the melodies considered to be rarely requested by users are stored in a second lyrics storage region.

Figure 9:
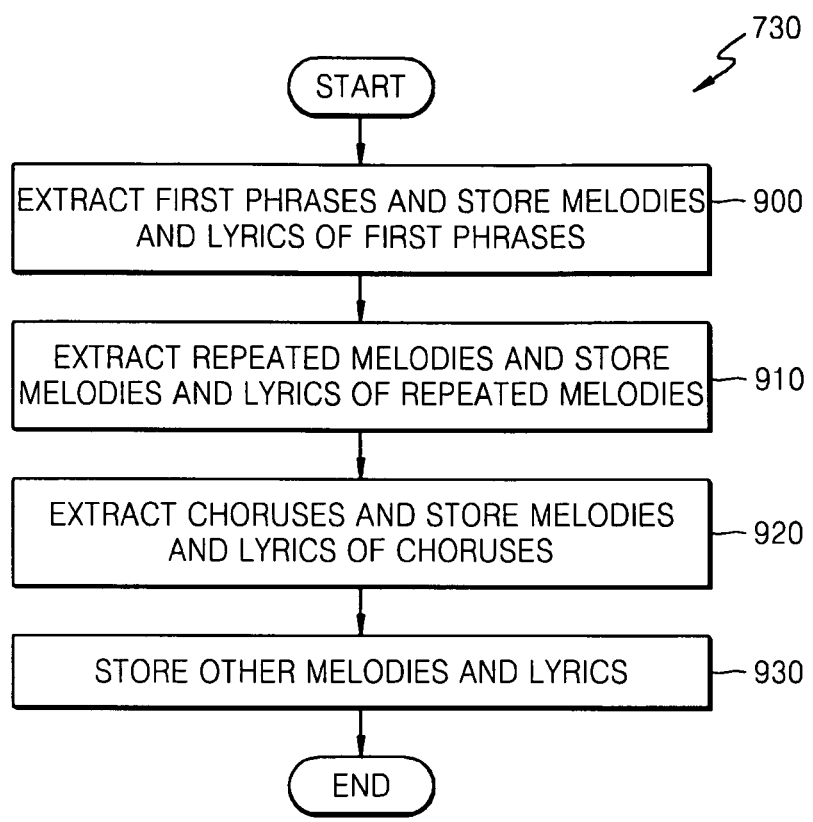
FIG. 9 is a detailed flowchart of operation 730 illustrated in FIG. 7, according to an embodiment of the present invention.

FIG. 9 is a detailed flowchart of operation 730 illustrated in FIG. 7, according to an embodiment of the present invention.

Referring to FIG. 9, first phrase melodies of songs are extracted from melodies divided in operation 720 illustrated in FIG. 7, in accordance with a preset phrase length so as to be stored in a first phrase melody storage region included in a first melody storage region, and lyrics corresponding to the first phrase melodies are extracted so as to be stored in a first phrase lyrics storage region included in a first lyrics storage region in operation 900.

Repeated melodies of the songs which are repeated more than a preset number of times, are extracted from the melodies divided in operation 720 illustrated in FIG. 7 so as to be stored in a repeated melody storage region included in the first melody storage region, and lyrics corresponding to the repeated melodies are extracted so as to be stored in a repeated melody lyrics storage region included in the first lyrics storage region in operation 910.

Chorus melodies of the songs are extracted from the melodies divided in operation 720 illustrated in FIG. 7 so as to be stored in a chorus melody storage region included in the first melody storage region, and lyrics corresponding to the chorus melodies are extracted so as to be stored in a chorus lyrics storage unit region included in the first lyrics storage region in operation 920.

Here, the first melody storage region stores melodies considered to be frequently requested by users and the first lyrics storage region stores lyrics corresponding to the melodies considered to be frequently requested by users.

Melodies which are not extracted in operations 900, 910, and 920 are stored in a second melody storage region and lyrics corresponding to the melodies are stored in a second lyrics storage region, in operation 930. Here, the second melody storage region stores melodies considered to be rarely requested by users and the second lyrics storage region stores lyrics corresponding to the melodies considered to be rarely requested by users.

Figure 10:
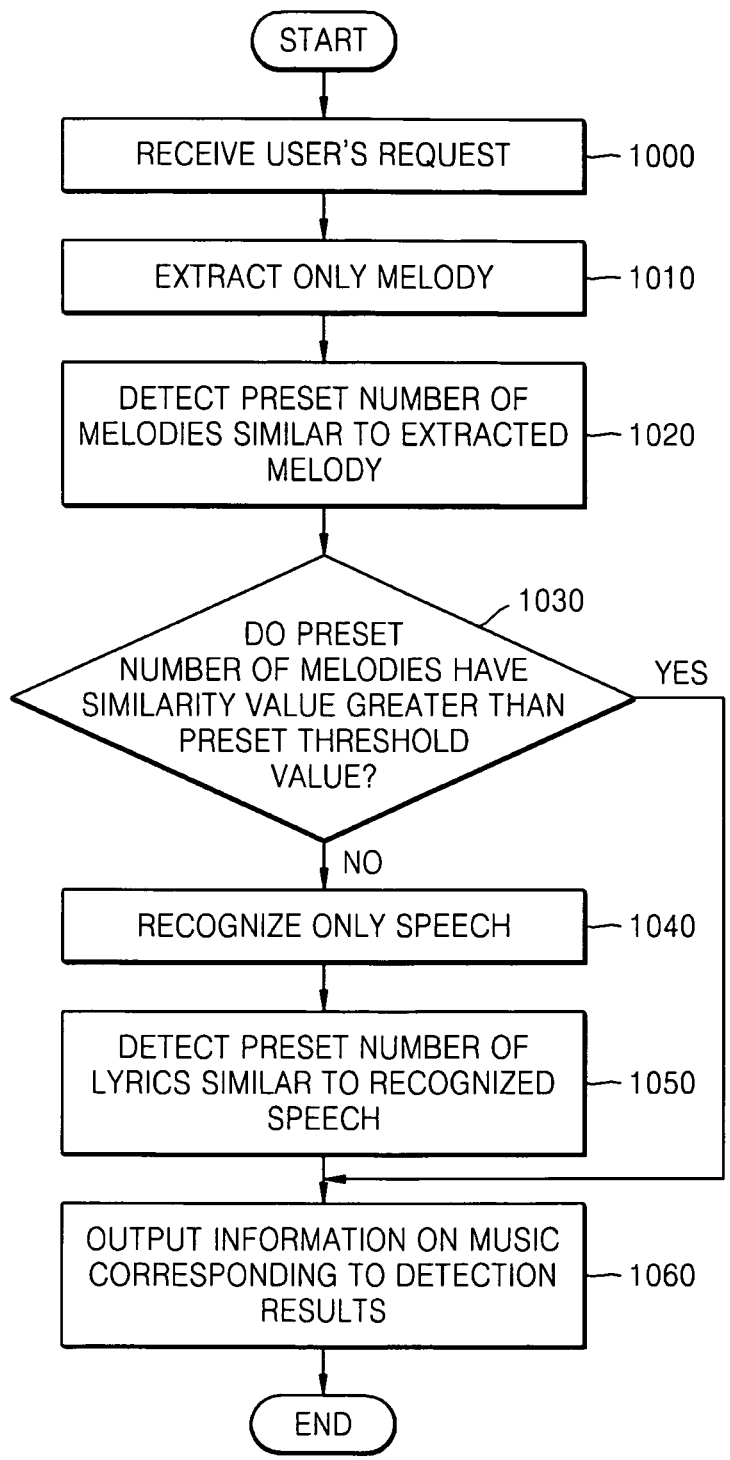
FIG. 10 is a flowchart of a method of searching for music, according to an embodiment of the present invention.

FIG. 10 is a flowchart of a method of searching for music, according to an embodiment of the present invention.

The method according to the current embodiment of FIG. 10 searches for music by comparing a request input by a user to melodies and lyrics which are divided and stored in accordance with a predetermined standard by the method according to the previous embodiment of FIG. 7.

Referring to FIG. 10, firstly, singing or humming is received as a user's request in operation 1000. Here, examples of the user's request include sound vocalized by a user and sound reproduced by a device such as a mobile phone.

Only melodies are extracted from the user's request received in operation 1000, in operation 1010.

A preset number of melodies which are similar to the melody extracted in operation 1010 are detected from melodies which are divided in accordance with at least one of bars extracted from melodies, phrase characteristics predicted from lyrics, and note lengths of phrases, and are stored in first and second melody storage regions, in operation 1020. Here, the first and second melody storage regions are identical to the first and second melody storage regions which are described above with reference to FIGS. 7, 8, and 9. As described above, the first and second melody storage regions store the melodies which are divided in accordance with at least one of the bars extracted from the melodies, the phrase characteristics predicted from the lyrics, and the note lengths of the phrases.

If the first and second melody storage regions store the melodies which are divided in accordance with the note lengths, the melodies may be divided and stored in accordance with the lengths of last notes of the phrases. Technical explanation regarding the dividing of the melodies is described in detail above with reference to FIG. 7.

Here, the first melody storage region stores melodies considered to be frequently requested by users. As described above with reference to FIG. 9, the first melody storage region may include a first phrase melody storage region, a repeated melody storage region, and a chorus melody storage region. The first phrase melody storage region stores first phrase melodies of songs, the repeated melody storage region stores repeated melodies of the songs which are repeated more than a preset number of times, and the chorus melody storage region stores chorus melodies of the songs. The second melody storage region stores melodies considered to be rarely requested by users.

It is determined whether the melody extracted in operation 1010 and the preset number of melodies detected in operation 1020 have a similarity value greater than a preset threshold value in operation 1030. For example, the similarity value may represent how similar certain melodies are. In this case, the preset threshold value may be 0.7. However, the present invention is not limited thereto and the preset threshold value is variable.

If it is determined that the melody extracted in operation 1010 and the preset number of melodies detected in operation 1020 have a similarity value greater than the preset threshold value in operation 1030, the searching of the music is terminated and information on pieces of music corresponding to the melodies detected in operation 1020 is output in operation 1060.

If it is determined that the melody extracted in operation 1010 and the preset number of melodies detected in operation 1020 have a similarity value equal to or less than the preset threshold value in operation 1030, only speech is recognized from the user's request received, in operation 1040. The speech is recognized from the user's request in order to compare the speech to words included in lyrics which are stored in first and second lyrics storage regions and correspond to the melodies detected in operation 1020. Here, the first and second lyrics storage regions are identical to the first and second lyrics storage regions which are described above with reference to FIGS. 7, 8, and 9. As described above, the first and second lyrics storage regions store divided lyrics corresponding to the melodies which are divided in accordance with at least one of the bars extracted from the melodies, the phrase characteristics predicted from the lyrics, and the note lengths of the phrases. If the first and second lyrics storage regions store divided lyrics corresponding to melodies divided in accordance with the note lengths, the divided lyrics corresponding to the melodies divided in accordance with the lengths of the last notes of the phrases may be stored. Technical explanation regarding the storing of the divided lyrics is described in detail above with reference to FIG. 7.

Here, the first lyrics storage region stores lyrics considered to be frequently requested by users or lyrics corresponding to the melodies considered to be frequently requested by users.

As described above with reference to FIG. 9, the first lyrics storage region may include a first phrase lyrics storage region, a repeated melody lyrics storage region, and a chorus lyrics storage region. The first phrase lyrics storage region stores lyrics corresponding to the first phrase melodies of the songs, the repeated melody lyrics storage region stores lyrics corresponding to the repeated melodies of the songs which are repeated more than a preset number of times, and the chorus lyrics storage region stores lyrics corresponding to the chorus melodies of the songs.

The second lyrics storage region stores lyrics corresponding to the melodies considered to be rarely requested by users.

A preset number of lyrics which are similar to the speech extracted in operation 1030 are detected from the lyrics stored in the first and second lyrics storage regions which correspond to the melodies detected in operation 1020, in operation 1050. Firstly, the preset number of lyrics are detected by searching the first lyrics storage region. Then, if the preset number of lyrics are not detected by searching the first lyrics storage region, the preset number of lyrics are detected by searching the second lyrics storage region. In more detail, the first lyrics storage region in which the lyrics considered to be frequently requested by users or the lyrics corresponding to the melodies considered to be frequently requested by users, such as the first phrase melodies, the repeated melodies, and the chorus melodies, are stored is firstly searched, and then the second lyrics storage region in which the lyrics considered to be rarely requested by users or the lyrics corresponding to the melodies considered to be rarely requested by users are stored is searched.

Information on pieces of music corresponding to the lyrics detected in operation 1050 is output in operation 1060.

The present invention can also be implemented as computer (all devices with data processing capability)-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

As described above, according to the above embodiment of the present invention, although a user does not know the title or lyrics of music, the user may efficiently and promptly search for the music by using humming or singing.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for searching music, the apparatus comprising:
    an input unit to receive a user's request including sound generated by at least one of the user and a device;
    a melody extraction unit to extract a melody from the sound; and
    a melody detection unit to detect music corresponding to the extracted melody by comparing the extracted melody with the melodies stored in a melody storage unit, based on phrase breaks of lyrics of the stored melodies and output information of the detected music,
wherein the phrase breaks of the lyrics are predicted using at least one of a syntactic structure of a sentence, information on parts of speech, and phrase location information.

2. The apparatus of claim 1, wherein the melody storage unit divides the melodies based on note lengths.

3. The apparatus of claim 1, further comprising:
a lyrics storage unit for dividing lyrics of the melodies so as to correspond to the melodies, and storing the lyrics; and
a lyrics detection unit for detecting a number of lyrics which are similar to the user's request, from the stored lyrics, in correspondence with the number of melodies detected by the melody detection unit.

4. The apparatus of claim 3, wherein the lyrics detection unit detects the number of melodies by recognizing speech from the user's request and comparing the speech to words included only in the number of lyrics detected by the lyrics detection unit.

5. The apparatus of claim 1, wherein the melody storage unit comprises:
a first melody storage unit for storing melodies considered to be frequently requested by users; and
a second melody storage unit for storing melodies considered to be rarely requested by users.

6. The apparatus of claim 5, wherein the first melody storage unit comprises:
a first phrase melody storage unit for storing first phrase melodies of songs;
a repeated melody storage unit for storing repeated melodies of the songs which are repeated more than a preset number of times; and
a chorus melody storage unit for storing chorus melodies of the songs.

7. The apparatus of claim 5, wherein the melody detection unit searches the first melody storage unit and then searches the second melody storage unit.

8. The apparatus of claim 3, wherein the lyrics storage unit comprises:
a first lyrics storage unit for storing lyrics considered to be frequently requested by users or lyrics corresponding to melodies considered to be frequently requested by users; and
a second lyrics storage unit for storing lyrics considered to be rarely requested by users or lyrics corresponding to melodies considered to be rarely requested by users.

9. The apparatus of claim 8, wherein the first lyrics storage unit comprises:
a first phrase lyrics storage unit for storing lyrics corresponding to first phrase melodies of the songs;
a repeated melody lyrics storage unit for storing lyrics corresponding to repeated melodies of the songs which are repeated more than a preset number of times; and
a chorus lyrics storage unit for storing lyrics corresponding to chorus melodies of the songs.

10. The apparatus of claim 8, wherein the lyrics detection unit searches the first lyrics storage unit and then searches the second lyrics storage unit.

11. The apparatus of claim 1, wherein the phrase breaks of the lyrics are predicted using a prosodic break index method that comprises a hidden Markov model (HMM) method, a neural network (NN) method, and a classification and regression tree (CART) method.

12. An apparatus to store music, the apparatus comprising:
a bar extraction unit to receive melodies and extract bars of the melodies;
a phrase break prediction unit to predict phrase breaks of the lyrics;
a division unit to divide melodies based on the bars extracted by the bar extraction unit and the phrase breaks predicted by the phrase break prediction unit; and
a melody storage unit to store the divided melodies,
wherein the phrase breaks of the lyrics are predicted using at least one of a syntactic structure of a sentence, information on parts of speech, and phrase location information.

13. The apparatus of claim 12, wherein the division unit divides the melodies based on note lengths.

14. The apparatus of claim 12, wherein the division unit does not divide the melodies at a bar included in a phrase.

15. The apparatus of claim 12, wherein the division unit divides the melodies at an end of a phrase predicted to be an intonational phrase (IP).

16. The apparatus of claim 12, wherein the division unit determines whether to divide the melodies at an end of a phrase predicted to be an accentual phrase (AP), in accordance with a length of a last note of the phrase.

17. The apparatus of claim 13, wherein the division unit determines to divide the melodies at the end of the phrase if the length of the last note of the phrase is longer than a preset length.

18. The apparatus of claim 12, further comprising a lyrics storage unit for dividing lyrics of the melodies so as to correspond to the melodies, and storing the lyrics.

19. The apparatus of claim 12, further comprising a classification unit for classifying the melodies into melodies considered to be frequently requested by users and melodies considered to be rarely requested by users, and
wherein the melody storage unit comprises:
a first melody storage unit for storing the melodies considered to be frequently requested by users; and
a second melody storage unit for storing the melodies considered to be rarely requested by users.

20. The apparatus of claim 19, wherein the first melody storage unit classifies and separately stores at least one of first phrase melodies of songs, repeated melodies of the songs which are repeated more than a preset number of times, and chorus melodies of the songs.

21. The apparatus of claim 18, wherein the lyrics storage unit comprises:
a first lyrics storage unit for storing lyrics considered to be frequently requested by users or lyrics corresponding to melodies considered to be frequently requested by users; and
a second lyrics storage unit for storing lyrics considered to be rarely requested by users or lyrics corresponding to melodies considered to be rarely requested by users.

22. The apparatus of claim 21, wherein the first lyrics storage unit classifies and separately stores at least one of lyrics corresponding to first phrase melodies of the songs, lyrics corresponding to repeated melodies of the songs which are repeated more than a preset number of times, and lyrics corresponding to chorus melodies of the songs.

23. A method of searching for music, comprising:
receiving a request of a sound to be recognized;
extracting a melody of the request;
detecting a preset number of melodies similar to the extracted melody;
recognizing only a speech of the request, if the preset number of melodies have a similarity value equal to or less than a preset threshold value;

detecting a preset number of lyrics similar to the recognized speech, if the preset number of melodies have a similarity value greater than a preset threshold value; and outputting information corresponding to the detecting results.

* * * * *